United States Patent [19]

Anderson

[11] Patent Number: 4,497,707
[45] Date of Patent: Feb. 5, 1985

[54] REGENERABLE FLOW-THROUGH OIL/WATER SEPARATION APPARATUS

[75] Inventor: Joseph W. Anderson, Bellevue, Wash.

[73] Assignee: Marine Construction & Design Co., Seattle, Wash.

[21] Appl. No.: 477,640

[22] Filed: Mar. 21, 1983

[51] Int. Cl.³ .............................................. B01D 29/38
[52] U.S. Cl. .................................... 210/136; 210/350; 210/508
[58] Field of Search ................ 210/350, 351, 352, 391, 210/393, 508, 509, 496, 136

[56] References Cited

U.S. PATENT DOCUMENTS

| | | | |
|---|---|---|---|
| 519,565 | 5/1894 | Bommarius | 210/391 |
| 622,614 | 4/1889 | Fleetwood | 210/351 |
| 1,070,249 | 8/1913 | Hall | 210/351 |
| 3,266,229 | 8/1966 | Witkowski | 210/496 |
| 4,356,090 | 10/1982 | Tran | 210/350 |

FOREIGN PATENT DOCUMENTS

719664  3/1980  U.S.S.R. .............................. 210/350

*Primary Examiner*—Ivars Cintins
*Attorney, Agent, or Firm*—Christensen, O'Connor, Johnson & Kindness

[57] ABSTRACT

Apparatus for separating water from oil employing a cylindrical, axially compressible, flow-through, oleophilic, hydrophobic reticular foam filter body covered peripherally with and bonded to a flow impervious flexible skin of resin impregnated fabric anchored at one end within a pressure vessel by a flow-through cap assembly sealing the adjacent end of the sleeve to the chamber wall. With the remainder of the sleeved filter body slidably retained and backed within such filter chamber, pressure applied intermittently to its opposite end compresses the filter body to squeeze oil accumulations therefrom. Cap means with one-way valve elements on such opposite end of the filter body permits flow of water through the filter body in one direction while obstructing reverse flow under fluid back pressure introduced into the downstream end of the pressure vessel so as to compress the filter body axially. Back-pressure fluid also entering the narrow gap surrounding the sleeve and the pressure vessel wall helps prevent binding of the accordioning sleeve therein during compression cycles.

11 Claims, 7 Drawing Figures

REGENERABLE FLOW-THROUGH OIL/WATER SEPARATION APPARATUS

BACKGROUND OF THE INVENTION

This invention relates to an improved flow-through oil/water separation apparatus of the type disclosed in Yahnke, U.S. Pat. No. 3,487,927; in Johnston et al., U.S. Pat. No. 3,617,551; in Anderson U.S. Pat. No. 4,213,863; and in Tran U.S. Pat. No. 4,356,090. The invention is herein illustratively described by reference to the presently preferred embodiment thereof; however, it will be recognized that certain modifications and changes with respect to details may be made without departing from the essential features involved.

In flow-through filter separation of oil from water in the many situations encountered, oil occurs in different states, each of which must be accommodated. As in certain prior devices, the present invention utilizes a stationary filter body of oleophilic hydrophobic open-pore foam material such as polyurethane foam, preferably reticulated but not necessarily so. Flow-through operation is periodically interrupted and the body of foam is forced into a state of full compression where it is held, preferably repeatedly one or more times, in order to force the accumulations of oil to flow out the end of the compressed body into an open drain, before flow-through operation is restored with the filter body reexpanded.

The Tran patent (cited above) disclosed an improved filter in which problems with mechanical failures were addressed, including the problem of a tendency of these flow-through filter bodies to progressively load up with oil and solids, increasing the resistance to flow through them, and thereby eventually causing the foam body to collapse and also to be bypassed. Shutdown of operations and cleaning of the prior foam filters became a frequent and expensive necessity precluding their unattended use for long time periods in remote field locations as often required by the practicalities of such industries as the oil industry. The Tran invention alleviated the problem of collapse of the filter body, but did not alleviate the bypass problem.

Once the resistance to flow through the pores of the filter body is increased by accumulations of oil and solids, continued application of flow pressure at the upstream end of the filter body caused oily mixture to channel itself around the filter body and along the interface between the perimeter of the body and the surrounding chamber wall so as to pollute the filtered product emerging from the downstream face of the filter body. Fruman, U.S. Pat. No. 4,022,694, addresses this problem. In order to prevent bypass flow around the filter body in that disclosure, reliance was placed on precompression of the filter body by the undersizing of a surrounding sleeve or envelope and also by the pressure of fluid within the annular housing space left surrounding the sleeved filter body as described. These sources of contact pressure were said to be sufficient, although mention was also made of possibly "gluing" the envelope to the filter body as well, but evidently only for the purposes of preventing shifting of the foam or filter block within the envelope and not in a manner nor for the purpose of preventing interfacial by-passed oil flow. As a practical matter, no specific method or means by which "gluing" could be accomplished effectively was described by Fruman, and this is one of the key problems wherein the sleeve must accordian under high stress loading of the "glued" bond so many times over the service life of the practical device. Fruman disclosed envelope sheeting of impervious fabric having a rubberized coating, such as a Hypalon coated sheet of polyester fabric or nylon, which experience has shown to be unsatisfactory because of a lack of durability of such materials in the presence of crude oil mixtures. Moreover, attempts to carry out Fruman's proposal using conventional "gluing" or bonding techniques with such sleeve materials results in such thickness and often such lumpiness of the solidified bond material in the foam adjoining the cloth sleeve as to preclude full and uniform compressibility of the foam and certainly to preclude it without failure stress levels in the materials during the numerous recyclings (i.e., compressions and reexpansions) requisite in such filters over prolonged operating periods. Even with most flexible sheeting materials otherwise suitable for prolonged exposure to the chemical action of crude oil mixtures, problems of durability remained seemingly insurmountable. In order to provide a satisfactory apparatus of this type, durability of performance efficiency for periods as long as one year or longer unattended proved to be essential for many types of service, taking into account the fact that these devices are often installed at remote locations in the field with little, if any, opportunity for periodic inspections and under conditions wherein frequent repairs or replacement of worn or defective cartridges are impracticable. Moreover, in order to maximize the average flow-through capacity of the filter in such applications, frequent purgings of oil and solids accumulations are necessary. This requirement complicates the problem of durability, of course, due to fatigue stress failure of materials and abrasive wear-through of the filter body skin or sleeve on the filter cylinder wall.

Thus, while oleophilic hydrophobic foam materials, both reticulated and nonreticulated, are available and have been available for years, which serve very effectively as a filter medium for separating oil from water in a flow-through filter, the numerous prior attempts to utilize such materials in a compact, efficient and durable recyclable filter device have not been fully successful. Some of the numerous prior attempts to appropriately seal and enclose the filter body with a skin or flow-impervious layer even included methods of applying directly to the foam itself a thin, durable, inflexible, impermeable and elastomeric coating. These included applications of synthetic materials by spraying, trolling, squeezing and rolling in various substances. Moreover, cloth was placed around the filter body and saturated with bonding and sealing resin. The problem there, as in the case of Fruman, was loss of flexibility, poor surface finish, unreliable strength of the resin bond, excess labor costs and the formation of unduly thick penetrations and lumps or hard spots under the skin as well as pinholes through the skin. Many of the more promising attempts proved unsatisfactory by failing under field conditions in a time as short as two or three weeks. These many and varied unsuccessful experiments made clear the full challenge of conceiving, developing and proving out whatever apparatus was to serve the special needs of industrial applications described above.

A principal object of the present invention is to provide such a flow-through oil/water separation filter with the durability and consistent reliability qualifying for operation in the field unattended for long time periods, such as a full year and longer. A specific objective is to devise such a filter device having bypass proof encasement and mounting means for its flow-through synthetic foam filter body of such durability as to permit operation of the device without breakdown or bypass flow leakage and notwithstanding the frequent recyclings (compression and reexpansion) necessary to keep the average flow-through resistance low throughout the long service periods of unattended operation needed by certain industries.

A specific object of this invention is to provide a means of providing a flow-impervious skin on the surface of a synthetic oil/water separator filter foam body which is effectively integrally bonded to the surface elements of the filter body without adding excessive thickness or lumps within the filter body adjacent the skin, with the relaxed flexibility needed to permit full and cross-sectionally uniform axial compression of the filter body and which retains the integrity of its bond to the filter body surface elements.

A related object is to further improve the filter devices made possible by the above-cited Trans patent invention.

BRIEF DESCRIPTION OF THE INVENTION

Described in summary, the present invention resides in an improved oil/water separation flow-through filter cartridge using foam material and a special mount for the same, including enclosure of the filter body over its axial length in a flexible, flow-impervious skin integrally bonded to the surface strands of the filter body and achieving the fulfillment of the aforementioned objectives as well as overcoming the problems indicated above. The preferred embodiment of the skin comprises a porous, flexibly elastic cloth, preferably a single knit 100% nylon fabric of medium to loose knit of about 2.9 ounces per square yard with 70 denier yarn. This cloth sleeve applied dry to the filter body has light resilience but does not appreciably compressively prestress the filter body and need not do so. It is preferably thereafter wetted by a suitable resin which, in curing, forms an integral bond between individual cloth strands and individual surface elements of the foam filter body contacted by them. To accomplish this, the first coat of resin applied to the cloth exterior is a barely saturating coat that, because of the character of the cloth weave, wicks through the cloth and wets the interfaces between the cloth strands and the foam surface elements they directly contact, but it does not run or flow on through in quantity to saturate or plug the foam pores and thereby create lumps or excessive subskin solid accretions impairing flexibility and uniform compessibility when the resin cures. Moreover, the wicking action tends to fill the pores of the cloth itself on the first coat, and does so fully with application of successive light coats, so as to form an essentially pinhole-free sleeve or skin. The dimensional allowance of a slight clearance between the skin-covered filter body and the casing wall permits low-friction sliding contact of the filter body with the wall during axial compression and expansion of the filter body, and at the same time provides expansion-limiting of the filter body skin to prevent rupture of the skin even under the highest internal pressures of oily water within the filter body.

A downstream end panel joined to the filter body has one-way valve means permitting filtration flow of water through the same, while closing in response to fluid back pressure applied intermittently thereto from an external source, such that the downstream end panel functions as a piston or ram at such times to compress the filter body and express oil accumulations from its strands. The downstream end panel itself is unsealed to the surrounding pressure chamber wall, such that back pressure fluid not only acts against the end panel, but it also surrounds the skinned filter body to help prevent its accordioning sleeve folds from binding frictionally against the pressure vessel wall.

At its upstream end, the filter body skin is fixed and sealed to the chamber wall by an end mount forming part of the end plate for the filter body so that liquid cannot bypass the filter body from the upstream end.

A prototype apparatus of this invention has been field tested in continuous service under demanding typical operating conditions for an uninterrupted full year of service and found to stand up and to perform efficiently throughout that period.

These and related aspects of the invention will become more fully evident as the description proceeds with reference to the accompanying drawings.

DETAILED DESCRIPTION REFERRING TO DRAWINGS

Figure 1:
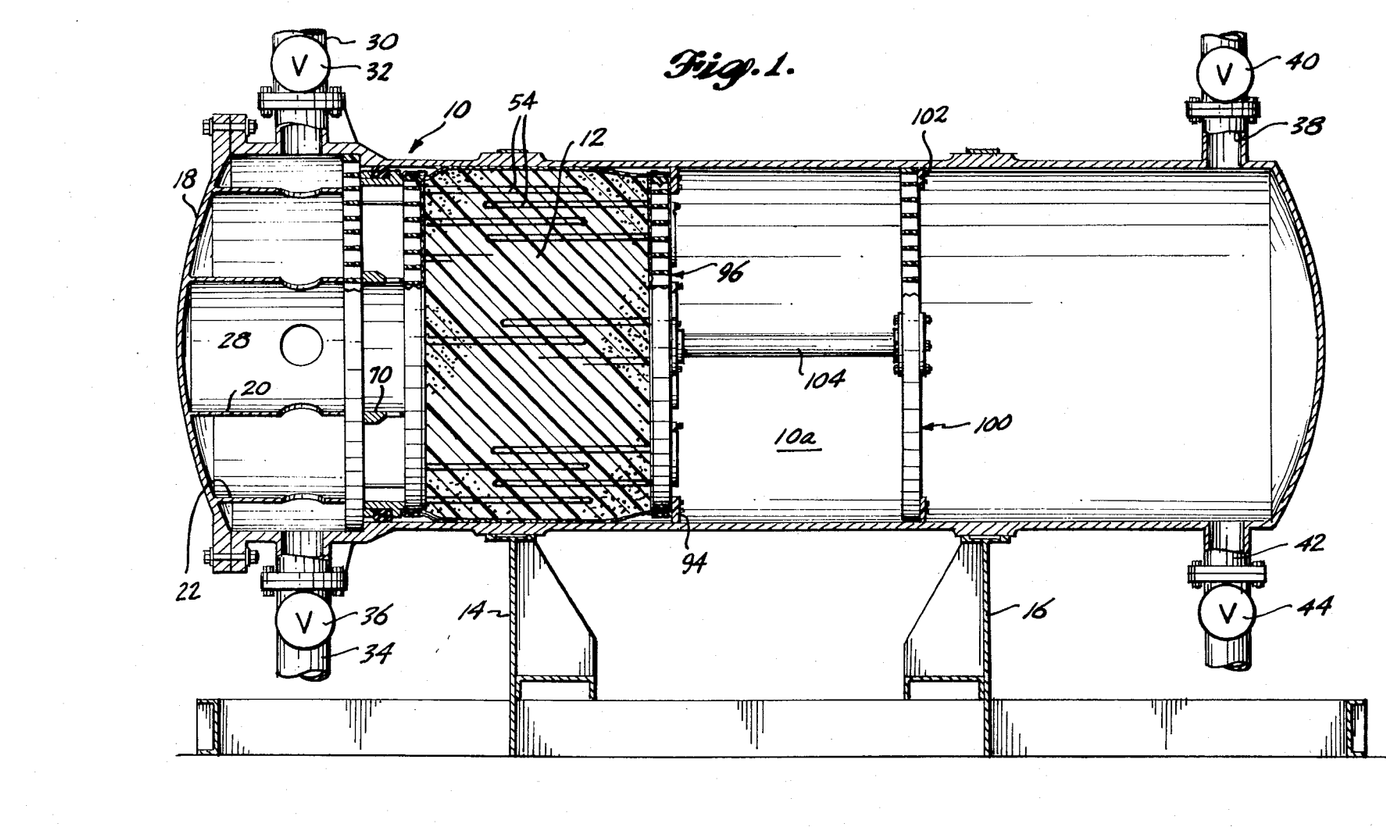
FIG. 1 is a longitudinal sectional view of a pressure vessel with a regenerable filter cartridge of the invention.

Pressure vessel 10, which forms the cylindrical chamber 10a accommodating filter body 12 within it, is mounted on suitable supports such as platform base members 14 and 16. Its inlet end has a domed pressure cover 18. Concentric wall-apertured tubes of respectively different diameters welded coaxially to the inside face of cover 18 terminate in coplanar opposite ends. Such opposite ends bear supportively against a rigid open filter cartridge end grid structure 24 to maintain the same, seated by its marginal edge rim against an annular shoulder 26 formed just within the adjacent end of the pressure vessel's annular cylindrical wall. Grid structure 24 having an annular rim 24a serves as a flow-through area-wide support for the adjacent end of the filter body 12. Its openings pass water carrying oil and solids for flow-through separation in filter body 12, such water being delivered under pressure into inlet chamber 28 through inlet pipe 30. Pipe 30 has a normally opened control valve 32. Chamber 28 also has an outlet or drain pipe 34 leading from its bottom, with a separate control valve 36 therein kept normally closed.

Near its opposite, outlet end, pressure vessel 10 has a pressure fluid inlet pipe 38 with a normally closed valve 40 and an outlet or drain pipe 42. Pipe 42 has a normally open control valve 44 therein. When the system is performing its normal flow-through oil/water separation function, valves 32 and 44 are open, and valves 40 and 36 are closed. Water from which oil and particles of solids are to be separated enters chamber 28, passes through the filter body 12 where the oil and particles of solids are trapped and held due to the oleophilic hydrophobic character of the reticulated or unreticulated foam strands or membranes of the filter body, and from there passes out through the end panel's flap valves 52 (to be described) for removal through drain pipe 42. When oil has accumulated within the filter body to an extent its removal is in order, valves 32 and 44 are closed, and valves 40 and 36 opened. Opening of valve 40 delivers fluid under pressure (from an external source not shown) into the downstream end of chamber 10*a*. As described hereafter, this action effects compression of the filter body so as to express accumulated oil from its strands into inlet chamber 28 for removal through drain pipe 34. Moreover, the very small accordianed volume and the relaxed flexibility of the thin integrally bonded skin permits substantially uniform compression of the filter body across its full cross section to express a maximum percentage of accumulated oil and solids in each regeneration cycle of filter operation as described. A detailed description of the filter cartridge device will make clear how this action takes place.

Figures 4, 5:
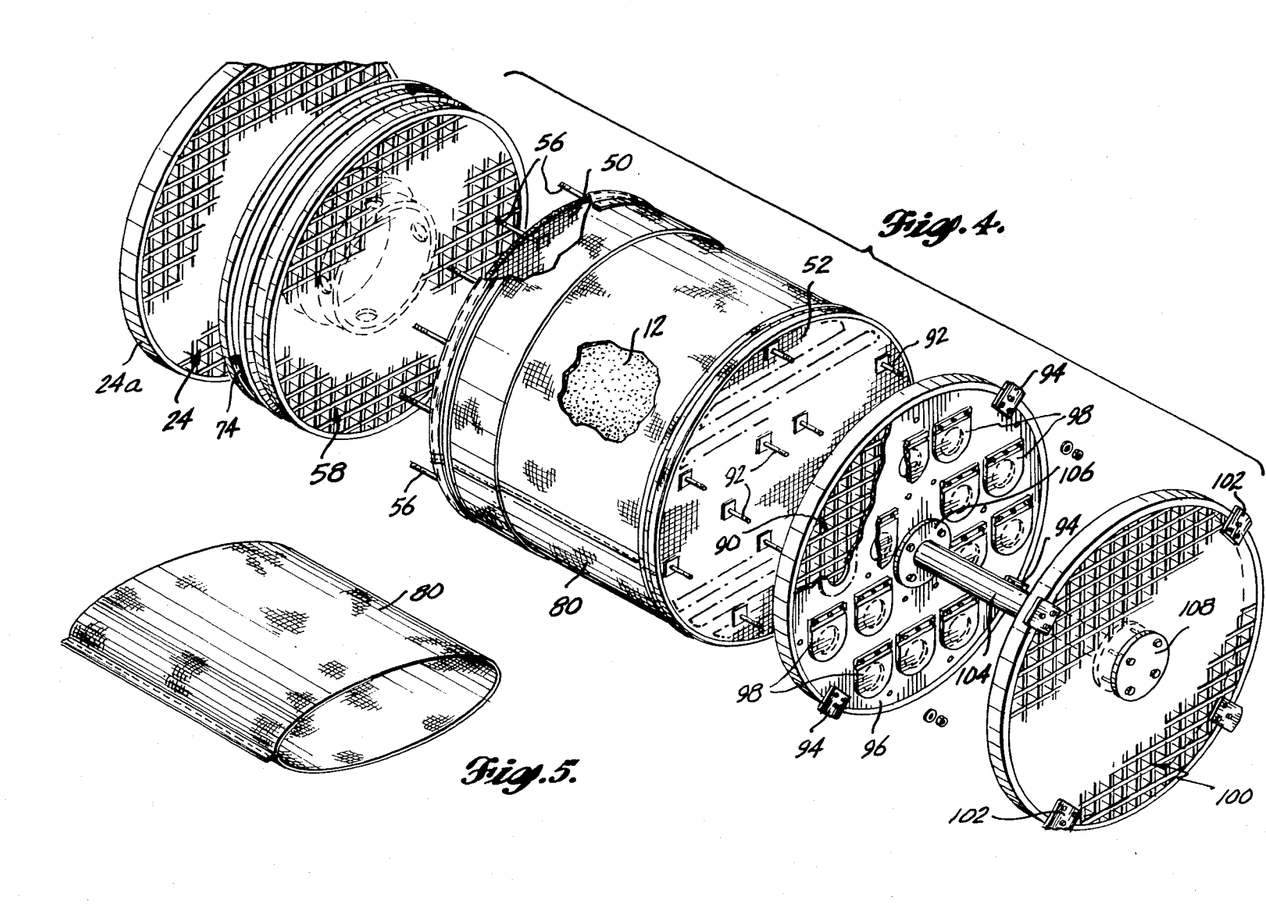
FIG. 4 is an exploded perspective view of the filter cartridge.
FIG. 5 is a perspective view of the filter cartridge sleeve.

Filter body 12 is preferably of circular cylindrical form and nearly as large in diameter as the pressure vessel's interior wall. It is formed of one or more disks of suitable oleophilic hydrophobic foam material, such as polyurethane foam in the pore size range of 10 to 100 pores per inch. As disclosed in U.S. Pat. No. 4,356,090, Tran, its ends are covered by the respective wire mesh grids 50 and 52 secured to the filter body by longitudinally extending looped runs of adhesive-saturated flexible cords 54. These cords penetrate deeply into the filter body from each end and at a number of locations distributed over the filter body's transverse cross section, and are bonded with numerous individual strands thereof contacted.

Rigid screen 50 on the filter body's upstream end carries a circular series of clamp bolts 56 projecting endwise from bolt end flanges 56*a* welded to it at locations distributed over the end area of the filter body. These clamp bolts, threaded over their length, pass first through openings in a disk-shaped openwork support grid 58 and carry washers 60 and clamp nuts 62 tightened to hold the screen 50 securely against the downstream face of grid 58. Clamp bolts 56 pass next through openings in a second, fixed grid 24 and carry washers 64 and clamp nuts 66. A multiply-apertured spacer tube 70 of materially lesser diameter than that of the filter body is clamped between the two grids 24 and 58 by tightening of nuts 66 on clamp bolts 56. With the clamp bolt circle being of a diameter intermediate that of spacer tube 70 and a peripheral ring 72, also serving as a spacer between the disk-shaped grids 24 and 58, firm retention and positioning of the grid 58, and thereby secure positioning of the adjacent end of the filter cartridge in the pressure chamber is assured.

Ring 72 (FIG. 3) has an outside annular rib 72*a* slightly smaller in diameter than the inside wall of the pressure vessel. Clamped by a retainer ring 76 against the end of this rib 72*a*, nearest grid 24 is a compressible elastic seal ring 74 which forms a flow-tight seal with the inside wall of the pressure vessel. Spaced downstream from rib 72*a* is a second annular rib 72*b* on ring 72.

Filter body 12 is snugly surrounded by a knitted "wicking" cloth 80 as described above slipped over the filter body under slight stretching force and thereafter lightly saturation coated with a liquid plastic substance (preferably liquid polyurethane or other resin of similar properties) that sets up with a flexible elastic characteristic preferably comparable with that of the foam strands themselves. The liquid plastic substance wets the fabric wicks through it to form a substantially pinhole free surface and to seep into the interstitial regions of contact between the fabric strands and the adjacent foam surface membranes or strands, thereby to bond to the individual surface strands of the foam to those of the fabric without excessive penetration into the foam and buildup of solid thick layer or lumps under the cloth. The result is a still flexible yet low-volume skin of uniform and predictably controllable thinness that has proved durable over a period of a year and longer of continuous field operation sufficient to meet industry requirements. During this durability test period, the filter body was necessarily compressed to a small fraction of its expanded volume to purge it of oil and solids accumulation virtually countless numbers of times, indeed, as frequently as necessary in order to keep average flow-through resistance at a low level and filter capacity, therefore, at a maximum for the physical size of the filter. Yet, over that extended test period, the specially formed and bonded skin 80, repeatedly folding accordionwise under compression and unfolding and stretched under flow-through load tension, withstood the test and the operating environment without failure. It did not crack, break through, nor leak.

Figure 3:
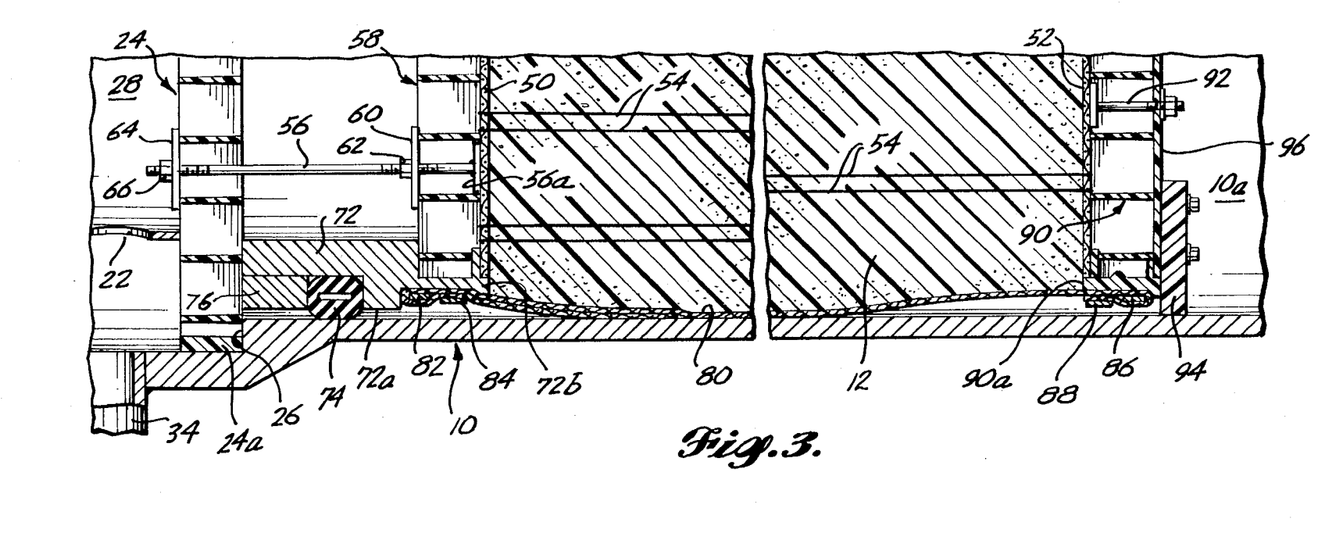
FIG. 3 is a still further enlarged fragmentary portion of the filter cartridge shown in FIGS. 1 and 2.
Figure 6:
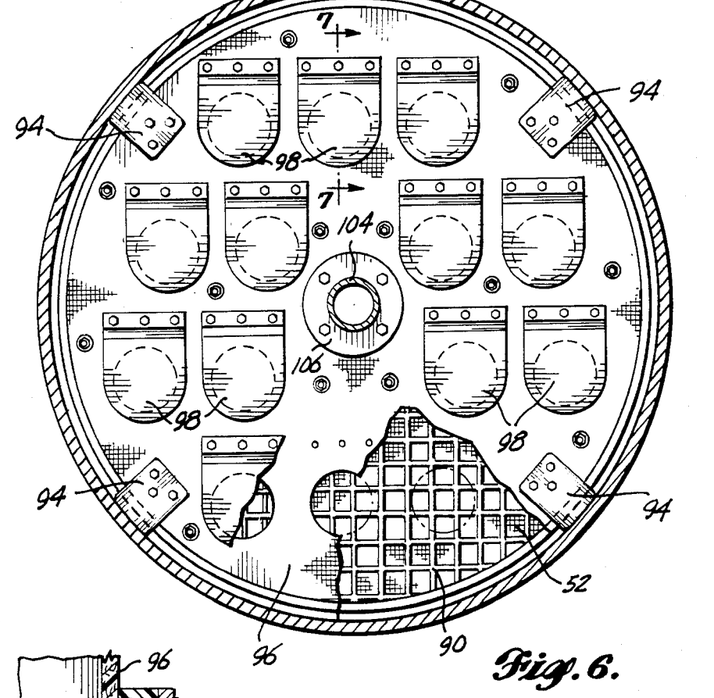
FIG. 6 is a face view of the multi-valve cap that mounts on the downstream end of the cartridge.
Figure 7:
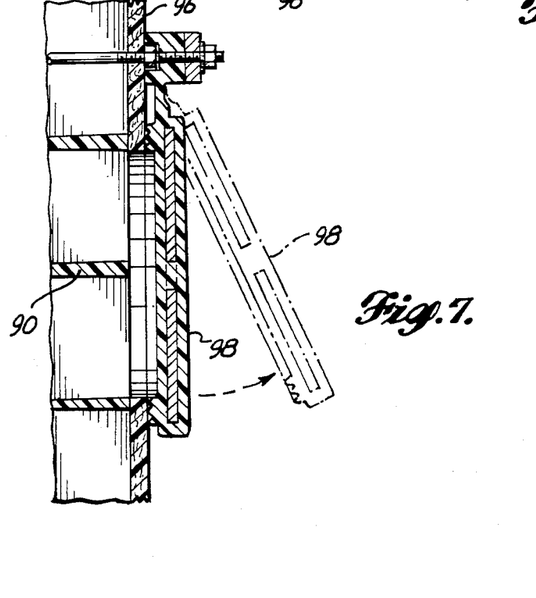
FIG. 7 is a fragmentary sectional view of the cap taken on line 7—7 in FIG. 6, illustrating one of the one-way valve elements.

Between ring flanges 72*a* and 72*b*, the extended skin end is clamped in a fluid-tight joint around the ring 72 by a first clamp ring 82 over which the end of the fabric is folded back upon itself and an adjacent second clamp ring 84 overlying the doubled thickness of fabric material. The skin's opposite (downstream) end is similarly clamped by clamp rings 86 and 88 around the rim ring 90*a* of an openwork disk-shaped grid 9 overlying the downstream face of filter body disk-shaped end screen 52. Grid ring 9, smaller in diameter than the interior pressure vessel wall, mounts a plurality of peripherally spaced slider pads or wall clearance bearings 94 of suitable low-friction material, such as "UHMW Polyethylene," that permit fluid under back pressure in chamber 10*a* to pass into and out of the radially thin annular space surrounding skin cloth 80. That space or gap should be made radially thin, such as of the order of 2%–4% of the sleeve diameter so as to enable the surrounding chamber wall to back up the sleeve against excessive expansion under flow-through working pressures. Yet such clearance is desirable to permit back-pressure fluid entering the clearance space during filter compression (oil purge) cycles to help prevent frictional binding of the accordioning skin folds against the chamber wall during axial compression. For purposes of cyclically interrupting flow-through oil/water separation flow for compressing the filter body to relieve it of oil accummulations, the fluid piston action is utilized against the downstream end of the filter body. To this end, disk-like openwork grid 90 is secured by clamp bolts 92 to the end screen 52 at a plurality of locations distributed over the area of the screen in the described manner by which grid 58 is clamped to upstream end screen 50. In the present instance, a flow impervious sheet 96 with a number of valve openings and one-way flap valves 98 covers and is secured in place overlying the downstream face of grid 90. During flow-through, filtration flap valves 98 are forced open. When fluid under back pressure is introduced through pipe 38 (valve 44 in drain pipe 44 then being closed), valves 98 are forced shut and the cartridge downstream end panel (52, 90 and 96), centered and slidable on pads 94, serves as a fluid piston forced by such back pressure to compress the filter body and to hold it compressed over the desired interval to allow time for the oil to run out and be removed by drain pipe 34. Preferably, this process is repeated one or more times on each such occasion in order to purge the filter body of most of its oil.

Figure 2:
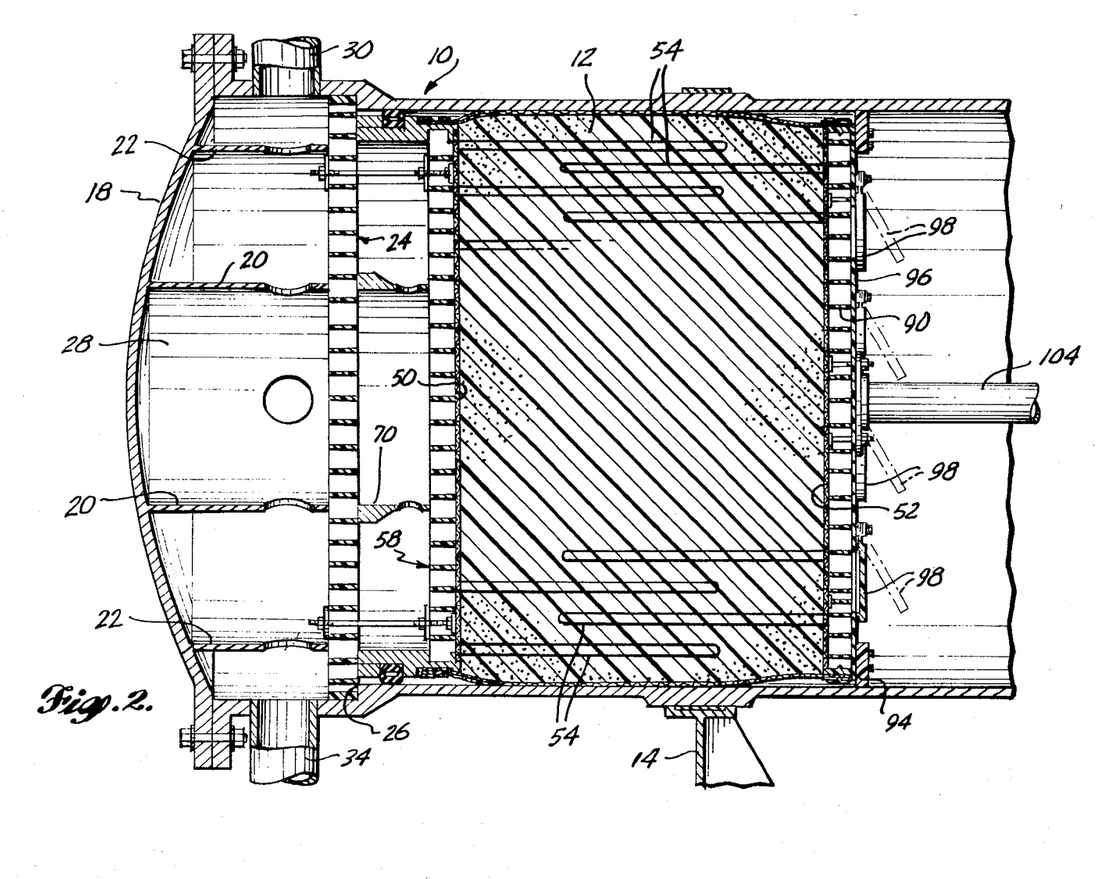
FIG. 2 is a fragmentary enlargement of the pressure vessel end portion with the filter cartridge as shown in FIG. 1.

Stabilization of such cartridge downstream end panel (52, 90, 96) against canting in the pressure chamber is provided by a second openwork disk-like grid 100 having wall slider pads 102 and joined to such end panel by a central shaft 104 having base flanges 106 and 108 and associated clamping plates for bolting the base flanges rigidly to the respective grids 90 and 100, respectively (FIGS. 2 and 5).

In use when water under pressure is flowing downstream through the filter body, the group of cords 54 hold the filter body against sagging or collapsing away from its upstream end panel under flow pressure as described in the Tran patent. Jacket or skin 80 also bonded to the numerous surface area strands it contacts and also firmly secured to the upstream end assembly of the filter cartridge, adds measurably to the role of the cords in supporting the filter body against its sagging under the forces of flow. It serves in this role as well as in the role of preventing bypass flow of oily/dirty water around the filter body. It accomplishes those objectives while retaining maximum filter cartridge internal flow-through cross section (hence capacity) while achieving easy filter compressibility followed by assured flow-restored expandability of the filter body.

These and related aspects of the invention in its disclosed preferred form and equivalent variations of the same, which the appended claims are intended to cover, will be evident to those skilled in this field of art.

The embodiments of the invention in which an exclusive property or privilege is claimed are defined as follows:

1. Regenerable filtration apparatus for separating dispersed immiscible liquids and/or solids from a continuous phase carrier liquid such as water, comprising a containment vessel having interior spaces interconnected by an elongated filter chamber having a substantially cylindrical interior wall, and a substantially cylindrical filter coaxially received in said filter chamber, the filter comprising a compressible and reexpandable filter body comprising strands of open-pore foam material, and a substantially flow-impervious, close-fitting flexible tubular skin bonded to the peripherally exterior strands of said filter body substantially throughout the length of the filter body, the skin at one end of said filter body being peripherally fixed and sealed in relation to and around the interior wall of said chamber while the remaining length of said skin is free to slide along said interior wall as the skin-covered filter body is compressed and reexpanded, the relative dimensions of the skin and filter body being selected such that the skin does not compress the filter body.

2. The apparatus defined in claim 1, wherein said skin comprises a sleeve of medium to loose knit multi-strand fabric encompassing said filter body and coated in place to saturation by a curable flexible synthetic binder, the binder sealing the pores in the fabric and also forming a bond at interstices of contact between the fabric strands and filter body surface strands.

3. The apparatus defined in claim 2, wherein said sleeve comprises a synthetic fabric of approximately 2.9 ounces per square yard of fabric knitted from approximately 70 denier yarn.

4. The apparatus defined in claim 3, wherein said yarn is nylon and the binder comprises a polyurethane resin.

5. The apparatus defined in claim 1, wherein said interior spaces comprise a liquid receiving chamber and a water collecting chamber, the liquid receiving chamber and water collecting chamber being interconnected by the filter chamber, the apparatus further comprising first flow-through means on the end of said filter body adjacent the liquid receiving chamber and second flow-through means on the end of said filter body adjacent the water collecting chamber, said second flow-through means being normally open to axial flow of water from said filter body into the water collecting chamber and operable under back pressure applied against the second flow-through means from said water collecting chamber to block reverse flow from the water collecting chamber into the filter body and thereby to compress said filter body against said first flow-through means so as to squeeze accumulated oil from said filter body back into said liquid receiving chamber.

6. The apparatus defined in claim 5, wherein said second flow-through means comprises an end cover having flow-through openings therein fitted with one-way valves open to axial flow of water from said filter body and operable to close against reverse flow.

7. The apparatus defined in claim 6, wherein the relative dimensions of the sleeve and the interior wall are such that there is an annular clearance therebetween, and wherein said second flow-through means has a marginal rim portion joined to said sleeve and slidable axially within said filter chamber while allowing fluid under back pressure in said water collecting chamber to pass said rim portion into the annular clearance, thereby to reduce frictional drag of said sleeve against the interior wall as said sleeve is accordioned during compression and reexpansion of said filter body.

8. The apparatus defined in claim 5, wherein the cylindrical filter body has a plurality of transversely distributed elongated flexible tension cord runs extending through the filter body parallel to the cylindrical axis thereof and adhesively bonded to strands of the filter body over the respective lengths of said cord runs, at least some of said cord runs being secured to said first flow-through means and others of the cord runs being secured to said second flow-through means.

9. In an oil/water separation apparatus, an axially compressible flow-through filter comprising an axially compressible and reexpandable substantially cylindrical filter body comprising strands of open-pore foam material, a flow-through end panel overlying one end of said filter body, the periphery of said end panel being substantially coextensive with the periphery of said filter body and said end panel being mounted in a surrounded casing and peripherally sealed to the casing, and a flexible tubular sleeve of multi-strand fabric surrounding said filter body substantially throughout the length of the filter body, the fabric having its own pores sealed and its strands integrally bonded to surface strands of said filter body by a cured flexible synthetic resin binder applied to said sleeve with said sleeve in place surrounding said filter body and absorbed into said sleeve and into bonding contact with outside surface strands of said filter body contacted by said sleeve, and means securing said sleeve at one end thereof to the periphery of said end panel.

10. The apparatus defined in claim 9, wherein said sleeve comprises a loose knit synthetic fabric of approximately 2.9 ounces per square yard of fabric knitted from approximately 70 denier yarn.

11. The apparatus defined in claim 10, wherein said yarn is nylon and said binder comprises polyurethane resin.

* * * * *